(12) United States Patent
McCauley

(10) Patent No.: US 6,513,846 B2
(45) Date of Patent: Feb. 4, 2003

(54) LENGTH-ADJUSTABLE GROUND-WORKING TOOL

(76) Inventor: Keith McCauley, 1399 Studer Ave., Columbus, OH (US) 43206

( * ) Notice: Subject to any disclaimer, the term of this patent is extended or adjusted under 35 U.S.C. 154(b) by 0 days.

(21) Appl. No.: 10/046,611

(22) Filed: Jan. 16, 2002

(65) Prior Publication Data

US 2002/0089199 A1 Jul. 11, 2002

(51) Int. Cl.[7] ................................................ A01B 1/22
(52) U.S. Cl. ...................................... 294/57; 403/109.1
(58) Field of Search ........................... 294/19.1, 49, 57, 294/58, 59; 16/429; 30/249, 296.1; 81/177.1; 403/109.1–109.8, 341, 373, 374.3, 377

(56) References Cited

U.S. PATENT DOCUMENTS

| | | | | |
|---|---|---|---|---|
| 1,411,195 A | * | 3/1922 | Shingler | 294/57 |
| 2,047,485 A | * | 7/1936 | McBrady | 294/57 |
| 2,793,902 A | * | 5/1957 | Govan | 294/57 |
| 3,226,149 A | * | 12/1965 | McJohnson | 294/57 X |
| 3,835,535 A | * | 9/1974 | Robison et al. | 16/429 X |
| 5,795,000 A | * | 8/1998 | Aldorasi | 294/57 |
| 6,272,755 B1 | * | 8/2001 | Mittlesteadt et al. | 30/249 |

FOREIGN PATENT DOCUMENTS

| | | | | |
|---|---|---|---|---|
| DE | 868232 | * | 2/1953 | 294/57 |
| GB | 122287 | * | 1/1919 | 294/57 |
| GB | 1454223 | * | 11/1976 | 294/57 |

* cited by examiner

*Primary Examiner*—Johnny D. Cherry

(57) ABSTRACT

A length-adjustable ground-working tool for allowing the user to adjust the length of the handle assembly for the ground-working tool. The length-adjustable ground-working tool includes a ground-working member; and also includes a handle assembly including a first tubular member being attached to the ground-working member and also includes a second tubular member being telescopingly connected to the first tubular member, and further includes a handle member being mounted to an end of the second tubular member; and further includes a fastening assembly including first and second bracket members for securely fastening the first and second tubular members together.

3 Claims, 4 Drawing Sheets

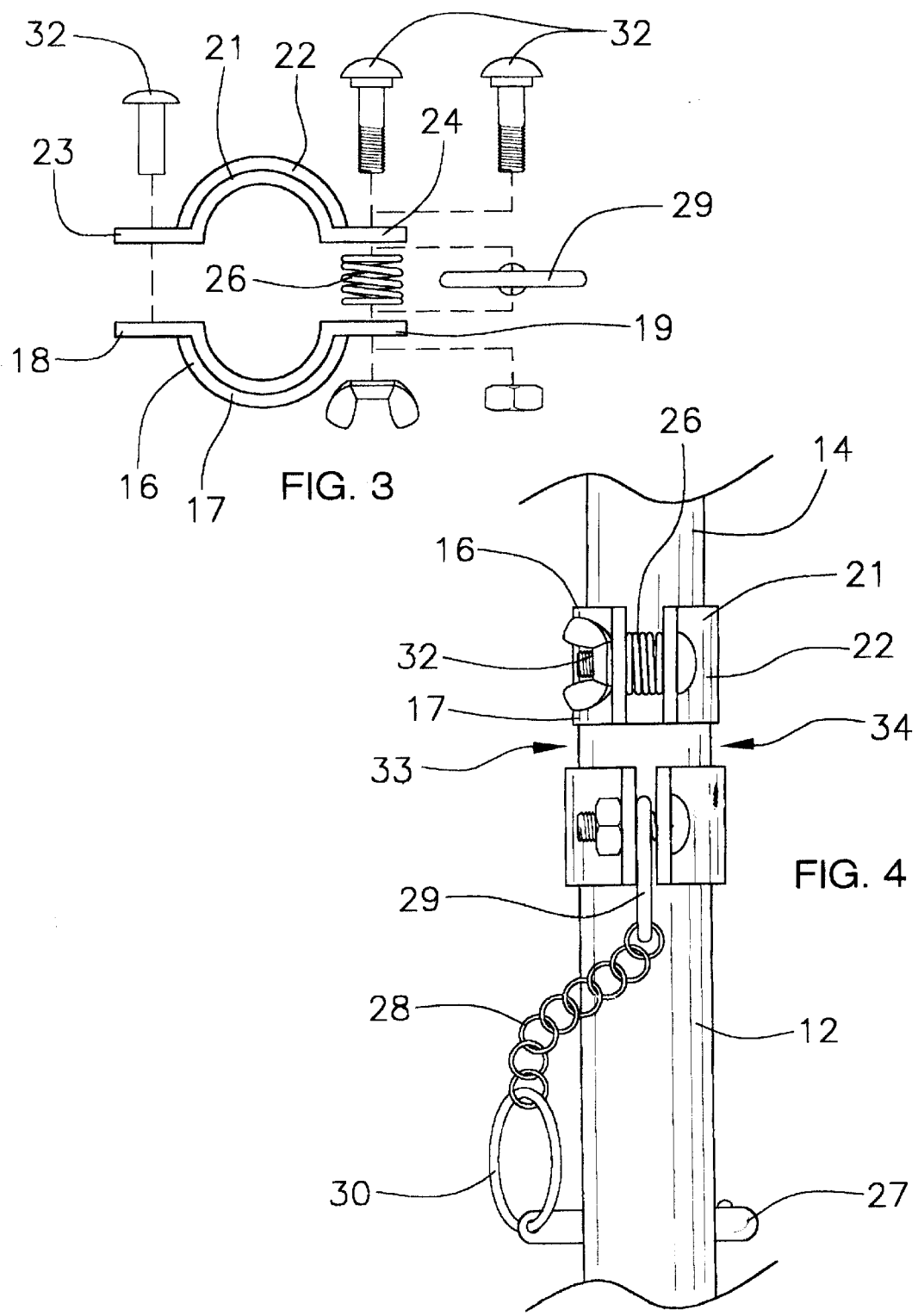

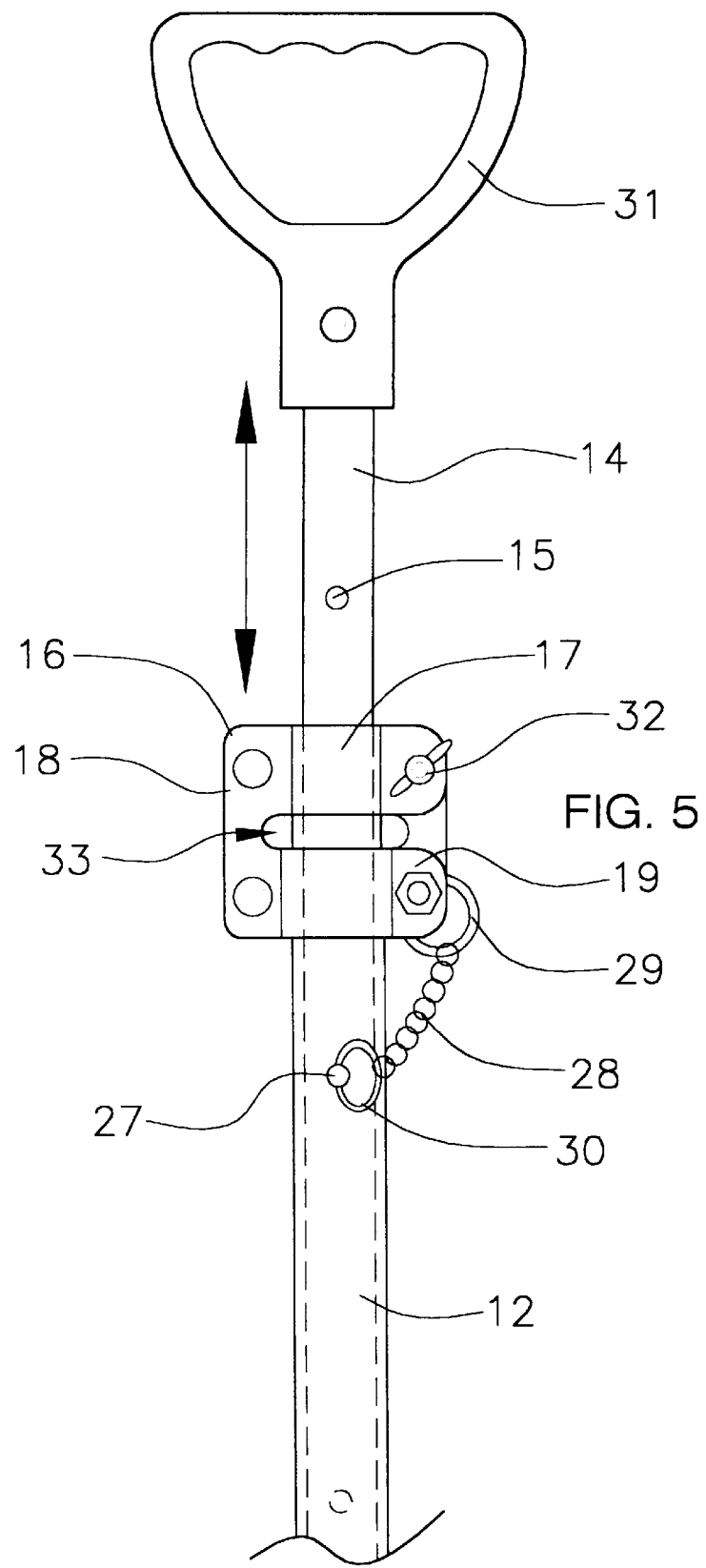

LENGTH-ADJUSTABLE GROUND-WORKING TOOL

BACKGROUND OF THE INVENTION

1. Field of the Invention

The present invention relates to ground-working tools and more particularly pertains to a new length-adjustable ground-working tool for allowing the user to adjust the length of the handle assembly for the ground-working tool.

2. Description of the Prior Art

The use of ground-working tools is known in the prior art. More specifically, ground-working tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,810,408; U.S. Pat. No. 5,743,580; U.S. Pat. No. 4,829,857; U.S. Pat. No. 4,793,646; U.S. Pat. No. 6,082,795; and U.S. Pat. No. Des. 429,977.

While these devices fulfill their respective, particular objectives and requirements, the aforementioned patents do not disclose a new length-adjustable ground-working tool. The inventive device includes a ground-working member; and also includes a handle assembly including a first tubular member being attached to the ground-working member and also includes a second tubular member being telescopingly connected to the first tubular member, and further includes a handle member being mounted to an end of the second tubular member; and further includes a fastening assembly including first and second bracket members for securely fastening the first and second tubular members together, and reinforces and strengthens the handle assembly as the handle assembly is lengthened, a feature not described nor shown in the prior art.

In these respects, the length-adjustable ground-working tool according to the present invention substantially departs from the conventional concepts and designs of the prior art, and in so doing provides an apparatus primarily developed for the purpose of allowing the user to adjust the length of the handle assembly for the ground-working tool.

SUMMARY OF THE INVENTION

The general purpose of the present invention, which will be described subsequently in greater detail, is to provide a new length-adjustable ground-working tool which has many of the advantages of the ground-working tools mentioned heretofore and many novel features that result in a new length-adjustable ground-working tool which is not anticipated, rendered obvious, suggested, or even implied by any of the prior art ground-working tools, either alone or in any combination thereof.

There has thus been outlined, rather broadly, the more important features of the length-adjustable ground-working tool in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new length-adjustable ground-working tool which has many of the advantages of the ground-working tools mentioned heretofore and many novel features that result in a new length-adjustable ground-working tool which is not anticipated, rendered obvious, suggested, or even implied by any of the prior art ground-working tools, either alone or in any combination thereof.

Still another object of the present invention is to provide a new length-adjustable ground-working tool for allowing the user to adjust the length of the handle assembly for the ground-working tool.

Still yet another object of the present invention is to provide a new length-adjustable ground-working tool that allows the user to lengthen the handle assembly while maintaining its strength.

Even still another object of the present invention is to provide a new length-adjustable ground-working tool that is easy and convenient to adjust and use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded top plan view of the fastening assembly of the present invention.

FIG. 4 is a partial side elevational view of the present invention.

FIG. 5 is a partial front elevational view of the present invention.

DESCRIPTION OF THE PREFERRED EMBODIMENT

Figure 1:
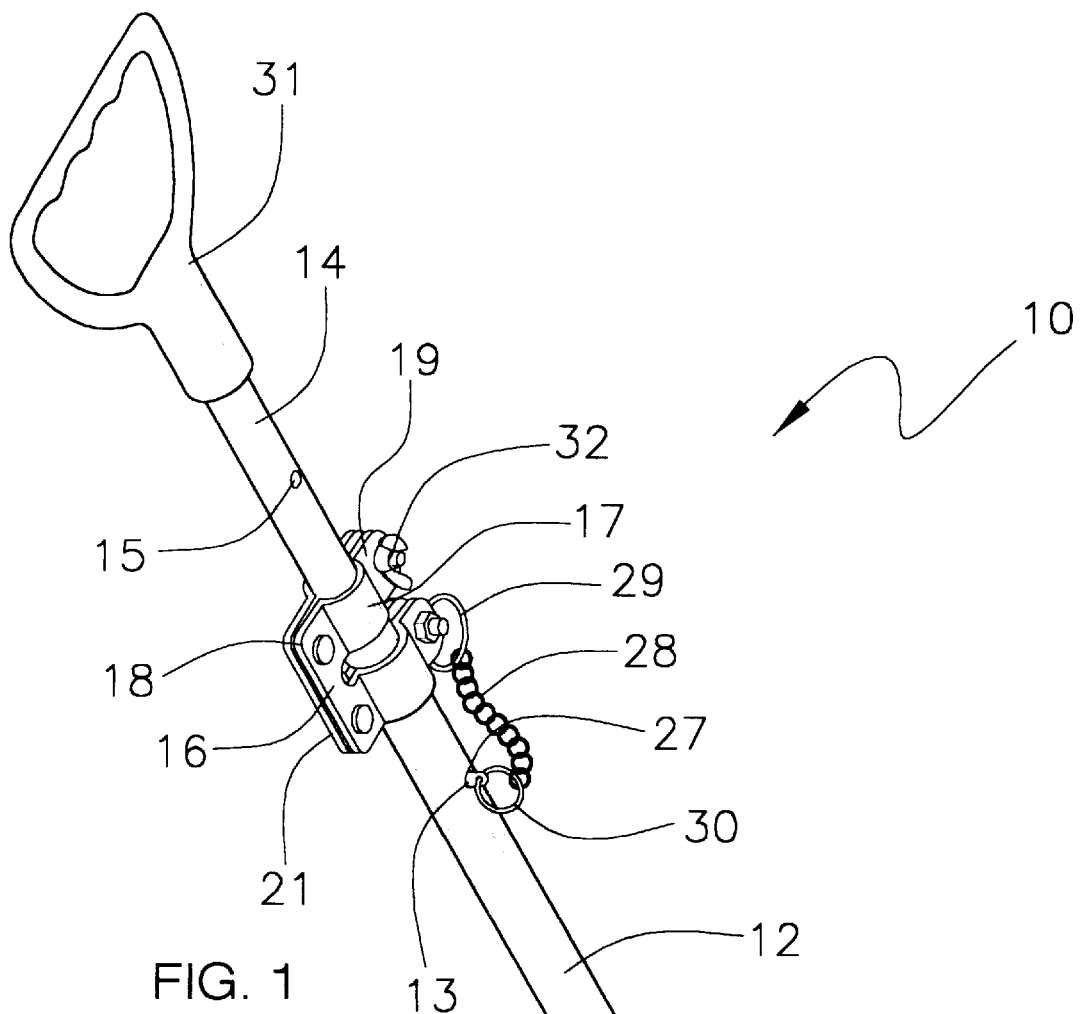
FIG. 1 is a perspective view of a new length-adjustable ground-working tool according to the present invention.
Figure 2:
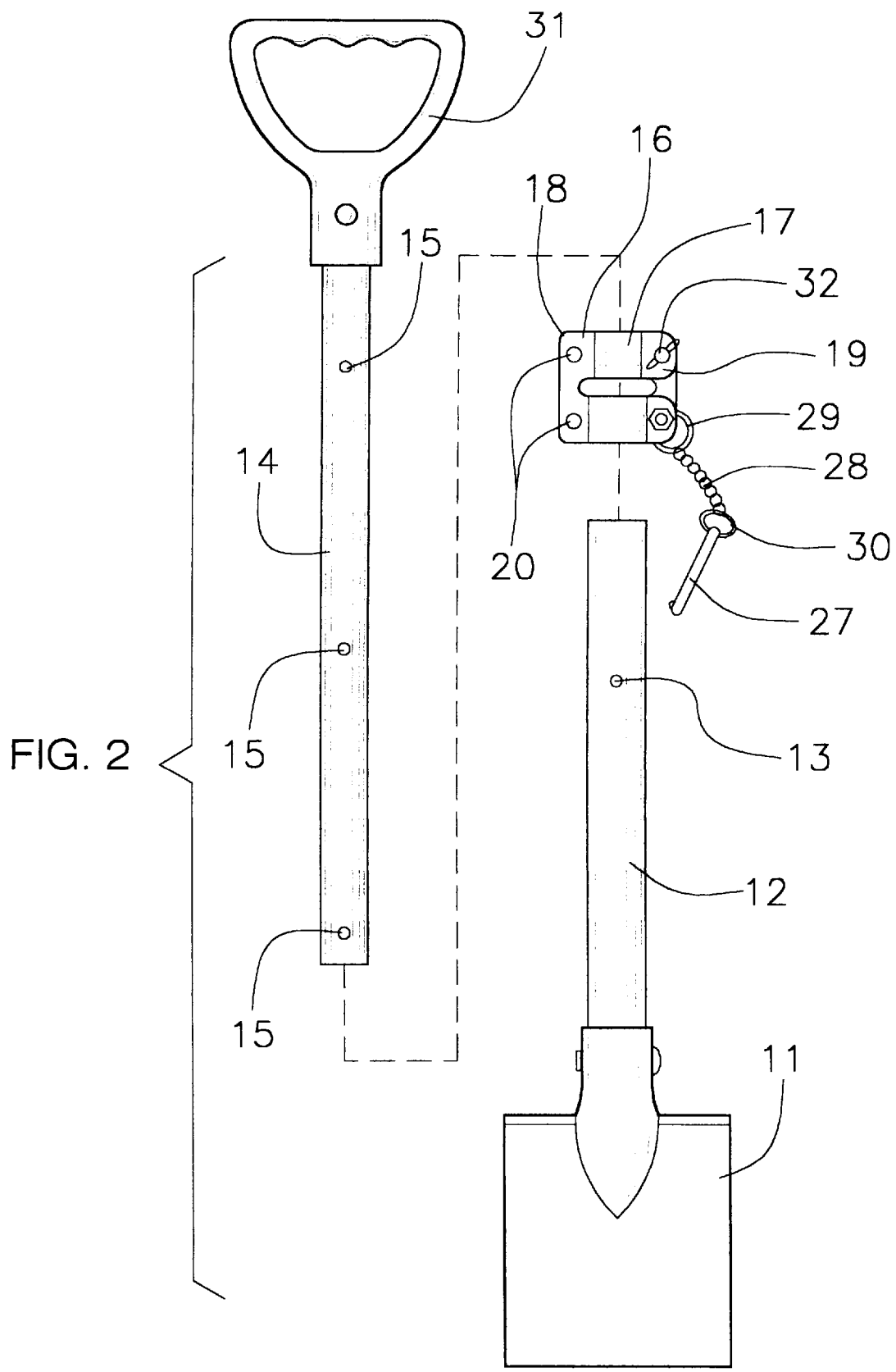
FIG. 2 is an exploded front elevational view of the present invention.

With reference now to the drawings, and in particular to FIGS. 1 through 5 thereof, a new length-adjustable ground-working tool embodying the principles and concepts of the present invention and generally designated by the reference numeral 10 will be described.

As best illustrated in FIGS. 1 through 5, the length-adjustable ground-working tool 10 generally comprises a ground-working member 11. A handle assembly includes a first tubular member 12 being conventionally attached to the ground-working member 11, and also includes a second tubular member 14 being telescopingly connected to the first tubular member 12, and further includes a handle member 31 being conventionally mounted and bolted to an end of the second tubular member 14. The first tubular member 12 has one or more holes 13 being disposed through a wall thereof, and the second tubular member 14 has one or more holes 15 being disposed through a wall thereof. The second tubular member 14 is telescopingly received in the first tubular member 12 through a top end thereof.

A fastening assembly includes first and second bracket members 16,21 for securely fastening the first and second tubular members 12,14 together. Each of the first and second bracket members 16,21 includes an arcuate central portion 17,22 extending from a top edge to a bottom edge thereof, and also includes planar wing portions 18,19,23,24 having holes 20 being disposed therethrough. Each of the arcuate central portions 17,22 is laterally curved and removably receives portions of the first and second tubular members 12,14. A laterally-extending slot 33,34 is disposed through the arcuate central portion 17,22 and one of the planar wing portions 19,24 of each of the first and second bracket members 16,21 to facilitate adjustment of the first and second tubular members 12,14. The fastening assembly further includes fasteners 32 for fastening the wing portions 18,19 of the first bracket member 16 to the wing portions 23,24 of the second bracket member 21, and also includes a spring member 26 being conventionally disposed about one of the fasteners 32 and between the first and second bracket members 16,21 to reduce the tension placed upon the first and second bracket members 16,21, and further includes a pin member 27 being removably disposed in any of the holes 13,15 of the first and second tubular members 12,14 for securing the first and second tubular members 12,14 together. The fastening assembly also includes a pin support member 28–30 having a first end being disposed about one of the fasteners 32 and having a second end being conventionally connected to the pin member 27. The pin support member 28–30 includes a chain 28 and ring members 29,30 being conventionally connected at ends of the chain 28.

In use, to set the length of the length-adjustable ground-working tool 10, the user loosens the fasteners 32 and removes the pin member 27 to adjust the length of the second tubular member 14 relative to the first tubular member 12, and then re-fastens the fasteners 32 to tighten the bracket members 16,21 about the first and second tubular members 12,14 and also inserts the pin member 27 in the selected holes 13,15 of the first and second tubular members 12,14. The length-adjustable ground-working tool 10 is now ready to be used for the desired work.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the length-adjustable ground-working tool. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A length-adjustable ground-working tool comprising:

a ground-working member;

a handle assembly including a first tubular member being attached to said ground-working member and also including a second tubular member being telescopingly connected to said first tubular member, and further including a handle member being mounted to an end of said second tubular member, said first tubular member having one or more holes being disposed through a wall thereof, and said second tubular member having one or more holes being disposed through a wall thereof, said second tubular member being telescopingly received in said first tubular member through a top end thereof; and a fastening assembly including first and second bracket members for securely fastening said first and second tubular members together, each of said first and second bracket members including an arcuate central portion extending from a top edge to a bottom edge thereof, and also including planar wing portions having holes disposed therethrough, said fastening assembly further including fasteners for fastening said wing portions of said first bracket member to said wing portions of said second bracket member, and also including a spring member being disposed about one of said fasteners and between said first and second bracket members, and further including a pin member being removably disposed in any of said holes of said first and second tubular members for securing said first and second tubular members together.

2. A length-adjustable ground-working tool as described in claim 1, wherein said fastening assembly also includes a pin support member having a first end being disposed about one of said fasteners and having a second end being connected to said pin member.

3. A length-adjustable ground-working tool as described in claim 2, wherein said pin support member includes a chain and ring members being connected at ends of said chain.

\* \* \* \* \*